(12) United States Patent
Dalsgaard et al.

(10) Patent No.: US 10,979,947 B2
(45) Date of Patent: Apr. 13, 2021

(54) DETERMINATION OF CARRIERS TO BE MONITORED IN COMMUNICATION

(71) Applicant: Nokia Solutions and Networks Oy, Espoo (FI)

(72) Inventors: Lars Dalsgaard, Oulu (FI); Li Zhang, Beijing (CN); Riikka Nurminen, Helsinki (FI)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 16/644,954

(22) PCT Filed: Sep. 18, 2017

(86) PCT No.: PCT/CN2017/102147
§ 371 (c)(1),
(2) Date: Mar. 5, 2020

(87) PCT Pub. No.: WO2019/051850
PCT Pub. Date: Mar. 21, 2019

(65) Prior Publication Data
US 2021/0037437 A1 Feb. 4, 2021

(51) Int. Cl.
*H04W 88/06* (2009.01)
*H04W 36/00* (2009.01)

(52) U.S. Cl.
CPC . *H04W 36/00837* (2018.08); *H04W 36/0066* (2013.01); *H04W 36/0069* (2018.08); *H04W 88/06* (2013.01)

(58) Field of Classification Search
CPC ....... H04W 36/00837; H04W 36/0069; H04W 36/0066; H04W 88/06
See application file for complete search history.

(56) References Cited

U.S. PATENT DOCUMENTS 8,588,846 B2 11/2013 Kazmi
9,629,194 B2 4/2017 Rahman et al.
(Continued)

FOREIGN PATENT DOCUMENTS

CN 101843141 A 9/2010
CN 103597899 A 2/2014
WO 2016/182534 A1 11/2016

OTHER PUBLICATIONS

"3rd Generation Partnership Project; Technical Specification Group Radio Access Network; Evolved Universal Terrestrial Radio Access (E-UTRA); Requirements for support of radio resource management (Release 14)", 3GPP TS 36.133, V14.4.0, Jun., 2017, pp. 1-2582.
(Continued)

*Primary Examiner* — Barry W Taylor
(74) *Attorney, Agent, or Firm* — Nokia Technologies Oy

(57) ABSTRACT

Embodiments of the present disclosure relate to a method and device for determining carriers to be monitored. In example embodiments, a first number of carriers of a first radio access technology (RAT) to be monitored by a terminal device when operating using a second RAT is determined. The second RAT is different from the first RAT. A first total number of carriers to be monitored by the terminal device when operating using the second RAT is determined at least in part based on the first number. A second number of carriers of the second RAT to be monitored by the terminal device when operating using the first RAT is determined. A second total number of carriers to be monitored by the terminal device when operating using the first RAT is determined at least in part based on the second number. Further, when the terminal device operates using both the first and second RATs, carriers to be monitored by the terminal device are determined based on a difference between a first sum of the first and second total numbers and (Continued)

a second sum of the first and second numbers. In this way, terminal inter-RAT mobility may be enhanced. Meanwhile, due to the subtraction of the duplicated numbers, terminal operations may be simplified, and terminal performance may be improved.

20 Claims, 3 Drawing Sheets

(56) References Cited

U.S. PATENT DOCUMENTS

| | | | |
|---|---|---|---|
| 9,635,574 | B2 | 4/2017 | Yiu et al. |
| 2012/0093073 | A1 | 4/2012 | Lunttila et al. |
| 2016/0295583 | A1 | 10/2016 | Kazmi et al. |
| 2019/0342890 | A1* | 11/2019 | Tong ................ H04W 8/24 |
| 2020/0236728 | A1* | 7/2020 | Yi ................ H04L 5/0092 |
| 2020/0322785 | A1* | 10/2020 | Jia ................ H04W 88/06 |

OTHER PUBLICATIONS

"3rd Generation Partnership Project; Technical Specification Group Radio Access Network; New Radio(NR); Requirements for support of radio resource management (Release 15)", 3GPP TS 38.133, V0.0.1, May, 2017, 15 pages.

"UE Capabilities for Increased Carrier Monitoring", 3GPP TSG-RAN WG2 meeting #87Bis, R2-144433, Agenda: 5.1, Samsung, Oct. 6-10, 2014, pp. 1-2.

International Search Report and Written Opinion received for corresponding Patent Cooperation Treaty Application No. PCT/CN2017/102147, dated Jun. 7, 2018, 9 pages.

\* cited by examiner

DETERMINATION OF CARRIERS TO BE MONITORED IN COMMUNICATION

RELATED APPLICATION

This application claims priority to PCT Application No. PCT/CN2017/102147 filed Sep. 18, 2017 which is incorporated herein by reference in its entirety.

FIELD

Embodiments of the present disclosure generally relate to the field of telecommunications, and in particular, to a method and device for determining carriers to be monitored.

BACKGROUND

Next Radio (NR) is being developed in the 3rd Generation Partnership Project (3GPP). In the first phase of this development, Non-Standalone (NSA) NR is concerned where a terminal device may operate in Evolved Universal Terrestrial Radio Access (E-UTRAN)-NR Dual Connectivity (EN-DC) with both NR and Long Term Evolution (LTE) networks. In later development phases of the NR, Standalone (SA) RN will be discussed.

In general, performance related requirements and the correspondingly expected minimum requirement may be predefined for the terminal device in the 3GPP. For example, the 3GPP may specify the requirements on the minimum terminal capability in terms of measurement capacity for carriers, such as the number of carriers to be measured by a terminal device during a handover. Accordingly, a minimum set of carriers to be measured may be determined based on these requirements for all terminal devices within a network, and proper measurement configurations for these terminals may be determined. Moreover, these requirements may be used for dimensioning and algorithm designs of the terminal devices.

SUMMARY

In general, example embodiments of the present disclosure provide a method and device for determining carriers to be monitored.

In a first aspect, a method is provided. In the method, a first number of carriers of a first radio access technology (RAT) to be monitored by a terminal device when operating using a second RAT is determined. The second RAT is different from the first RAT. A first total number of carriers to be monitored by the terminal device when operating using the second RAT is determined at least in part based on the first number. A second number of carriers of the second RAT to be monitored by the terminal device when operating using the first RAT is determined. A second total number of carriers to be monitored by the terminal device when operating using the first RAT is determined at least in part based on the second number. Further, when the terminal device operates using both the first and second RATs, carriers to be monitored by the terminal device are determined based on a difference between a first sum of the first and second total numbers and a second sum of the first and second numbers.

In a second aspect, there is provided an electronic device which comprises: a processor; and a memory containing a computer program which, when executed by the processor, causes the processor to perform acts including: determining a first number of carriers of a first radio access technology (RAT) to be monitored by a terminal device when operating using a second RAT different from the first RAT; determining, at least in part based on the first number, a first total number of carriers to be monitored by the terminal device when operating using the second RAT; determining a second number of carriers of the second RAT to be monitored by the terminal device when operating using the first RAT; determining, at least in part based on the second number, a second total number of carriers to be monitored by the terminal device when operating using the first RAT; and in response to the terminal device operating using both the first and second RATs, determining carriers to be monitored based on a difference between a first sum of the first and second total numbers and a second sum of the first and second numbers.

In a third aspect, there is provided a computer readable storage medium that tangibly stores a computer program thereon. The computer program, when executed by a device, causes the device to carry out the method according to the first aspect.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Through the more detailed description of some embodiments of the present disclosure in the accompanying drawings, the above and other objects, features and advantages of the present disclosure will become more apparent, wherein.

Throughout the drawings, the same or similar reference numerals represent the same or similar element.

DETAILED DESCRIPTION

Figure 1:
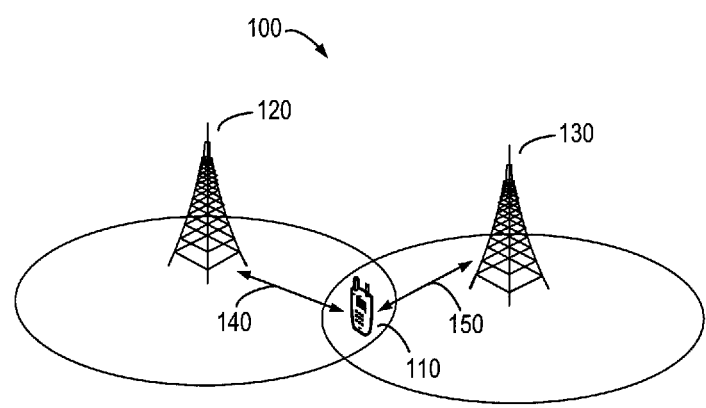
FIG. 1 shows an example network in which embodiments of the present disclosure can be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the term "terminal device" refers to a device capable of, configured for, arranged for, and/or operable for communications with a network device or a further terminal device in a wireless communication network. The communications may involve transmitting and/or receiving wireless signals using electromagnetic signals, radio waves, infrared signals, and/or other types of signals suitable for conveying information through air. In particular embodiments, the terminal device may be configured to transmit and/or receive information without direct human interaction. For instance, the terminal device may be designed to transmit information to a network side on predetermined schedules, when triggered by an internal or external event, or in response to requests from the network side.

The terminal device may refer to the endpoint of a wireless connection. Accordingly, the terminal device may be referred to as a wireless terminal. Furthermore, the terminal device may be mobile and, accordingly, referred to as a mobile device or a mobile terminal. Examples of the terminal device include, but are not limited to, user equipment (UE) such as smart phones. Further examples of the terminal device include wireless-enabled tablet computers, laptop-embedded equipment (LEE), laptop-mounted equipment (LME), and/or wireless customer-premises equipment (CPE).

As used herein, the term "user equipment" or "UE" may not necessarily have a "user" in the sense of a human user who owns and/or operates the relevant device. Instead, the UE refers to a device that is intended for sale to, or operation by, a human user but that may not initially be associated with a specific human user. For the purpose of discussion, in the following, some embodiments will be described with reference to UEs as examples of the terminal devices, and the terms "terminal device" and "user equipment" (UE) may be used interchangeably in the context of the present disclosure.

As used herein, the term "access nodes" refers to a transmission/reception device in an access network, which provides a coverage area and via which a terminal device within the coverage area may access the network and/or services. Examples of the network device include, but are not limited to, a base station (BS), a relay, an access point (AP), Multi-cell/Multicast Coordination Entity (MCE), a gateway, a server, a controller or any other suitable device in the wireless communication network. The BS may include, for example, a node B (NodeB or NB), an evolved NodeB (eNodeB or eNB), a next generation NodeB (gNB), a Remote Radio Module (RRU), a radio header (RH), a remote radio head (RRH), a low power node such as a femto, a pico, and the like. For the purpose of discussion, in the following, some embodiments will be described with reference to an eNB as an example of the network device.

As used herein, the term "network device" refers to any suitable device at a network side. The network device may include the access node in the access network or devices in any other part of the network. As an example, the network device may include a device in a core network. Examples of such a network device include multi-standard radio (MSR) radio equipment such as MSR BSs, network controllers such as radio network controllers (RNCs) or base station controllers (BSCs), base transceiver stations (BTSs), transmission points, transmission nodes, transmit-receive points (TRPs), Multi-cell/multicast Coordination Entities (MCEs), core access nodes, such as Mobile Switching Centers (MSCs) and MMEs, Operation and Management (O&M) nodes, Operation Support System (OSS) nodes, Self-Organization Network (SON) nodes, positioning nodes, such as Enhanced Serving Mobile Location Centers (E-SMLCs), and/or Mobile Data Terminals (MDTs).

As used herein, the singular forms "a", "an", and "the" are intended to include the plural forms as well, unless the context clearly indicates otherwise. The term "includes" and its variants are to be read as open terms that mean "includes, but is not limited to". The term "based on" is to be read as "based at least in part on". The term "one embodiment" and "an embodiment" are to be read as "at least one embodiment". The term "another embodiment" is to be read as "at least one other embodiment". Other definitions, explicit and implicit, may be included below.

So far, multiple specifications have been developed for different Radio Access Technologies (RATs) in the 3GPP. These specifications are proposed per RAT. Accordingly, all requirements are specified on a per RAT basis. No single specification has taken more than one RAT into account. As a result, these specifications can only enable a terminal device having one RAT active at a time, but not enable a terminal device having a plurality of RATs active simultaneously.

As described above, the number of carriers to be measured by a terminal device during a handover may be predefined by the 3GPP. For example, the total number of carriers that the terminal device at least needs to be able to monitor has been discussed. Just as other requirements, this requirement has so far been specified per RAT. For example, the LTE requires that the terminal device shall be able to monitor X carriers of Global System for Mobile (GSM) and Y carriers of Universal Mobile Telecommunications System (UMTS) (for example, in inter-RAT measurements), and Z carriers of the LTE (for example, in FDD/TDD or inter-frequency measurements). In total, the terminal device shall be able to monitor M carriers with $M<=X+Y+Z$.

However, the number of carriers that a terminal device is able to monitor depends on a specific capability of that terminal device. That is, this number is a requirement per a terminal device. In particular, when the terminal device operates using a NSA mode as mentioned above, the terminal device needs to enable both the LTE and the NR being active simultaneously. That is, the terminal device has more than one RAT active at a time. Moreover, in the NSA mode, the terminal device may also be able to enable the LTE alone. When the SA is introduced in the near future, the terminal device needs to enable NR alone as well.

In determining the requirements for a terminal device in the dual connectivity (DC) using two RATs active simultaneously, one challenge is how to determine general requirements for the terminal devices across different RATs. For example, it has been proposed for the NSA that a LTE cell may serve as a primary cell (PCell), and an access node serving the LTE cell may act as a master node (MN). It has also been proposed that a NR cell may serve as a primary secondary cell (PSCell), and an access node serving the NR cell may act as a secondary node (SN). In this case, terminal measurement configurations need to be determined in both the PCell and the PSCell. The total number of carriers that the terminal device at least needs to be able to monitor is also required when the terminal device operates in the NSA DC with both the PCell and the PSCell.

Embodiments of the present disclosure provide a new mechanism for determining carriers to be monitored. According to embodiments of the present disclosure, the number (referred to as a "first number") of carriers of a RAT (referred to as a "first RAT") to be monitored by a terminal device when operating using a further RAT (referred to as a "second RAT"). The second RAT is different from the first RAT. A total number (referred to as a "first total number") of carriers to be monitored by the terminal device when operating using the second RAT is determined at least in part based on the first number. Moreover, the number (referred to as a "second number") of carriers of the second RAT to be monitored by the terminal device when operating using the first RAT is determined. A total number (referred to as a "second total number") of carriers to be monitored by the terminal device when operating using the first RAT is determined at least in part based on the second number. Further, when the terminal device operates using both the first and second RATs, carriers to be monitored by the terminal device are determined based on a difference between a first sum of the first and second total numbers and a second sum of the first and second numbers.

In this way, the carriers to be monitored by the terminal device when operating using both the first and second RATs can be determined based on the combination of the carriers to be monitored by the terminal device when operating using the first or second RAT alone and removal of the duplicated carriers. For example, the total number of carriers to be monitored by the terminal device when operating using both the LTE and NR (for example, in the NSA mode) may be determined as the combination of the numbers of LTE and NR carriers with a duplicated number of carriers being subtracted. The determined total number of carriers is in alignment with as well as separated from the numbers of carriers in either the first or second RAT. Furthermore, the terminal device may monitor as many carriers as possible, and therefore terminal inter-RAT mobility may be enhanced. Additionally, due to the subtraction of the duplicated number of carriers, terminal operations may be simplified, and terminal performance may be improved.

FIG. 1 shows an example network 100 in which embodiments of the present disclosure can be implemented. The network 100 includes a terminal device 110 and two access nodes including a first access node 120 and a second access node 130. It is to be understood that the numbers of terminal devices and access nodes as shown is only illustrative but not limited. The network 100 may include any suitable numbers of terminal devices and access nodes. It is also to be understood that the terminal devices 110 and the access nodes 120 and 130 included in the network 100 are only illustrative but not limited. The network device 100 may further include any other suitable device (not shown), including, for example, a core network device, such as a radio network controller (RNC).

In the network 100, the first and second access nodes 120 and 130 may enable one or more RATs. Moreover, the first and second access nodes 120 and 130 may or may not enable different RATs. In this example, the first access node 120 may enable the first RAT 140, and the second access node 130 may enable the second RAT 150 different from the first RAT 140, as shown.

The terminal device 110 may operate in a plurality of RATs at least including the first and second RATs 140 and 150, either separately or simultaneously. As shown, the terminal device 110 may communicate with the first and second access nodes 120 and 130 using the first and second RATs 140 and 150, respectively.

Other RATs than the first and second RATs may also be enabled in the network 100. The enabled RATs may include any suitable RAT either currently known or to be developed in the future. Example RATs may include, but be not limited to, Global System for Mobile (GSM), Universal Mobile Telecommunications System (UMTS), Code Division Multiple Access (CDMA), Time Division-Synchronous Code Division Multiple Access (TD-SCDMA), Wideband Code Division Multiple Access (WCDMA), High-Speed Packet Access (HSPA), Long Term Evolution (LTE), LTE-Advanced (LTE-A), Next Radio (NR), and the like.

Hereinafter, some embodiments of the present disclosure will be described in the case that the LTE acts as the first RAT 140 and the NR acts as the second RAT 150. However, it is to be understood that this is only for the purpose of discussion, without suggesting any limitations to the scope of the present disclosure.

According to embodiments of the present disclosure, when the terminal device 110 operates using both the first and second RATs 140 and 150, the carriers to be monitored by the terminal device 110 are determined in the network 100 by considering the combination of the numbers of carriers to be monitored separately using the two RATs 140 and 150. For example, the total number of carriers to be monitored follows the number of carriers to be monitored when the terminal device operates in the first or second RAT only. In this way, the terminal device 110 may measure the carriers of both the first and second RATs, and therefore the inter-RAT mobility of the terminal device 110 may be enhanced. Additionally, the number of carriers that may be monitored redundantly is subtracted from the total number of carriers. As a result, terminal operation efficiency may be improved.

Figure 2:
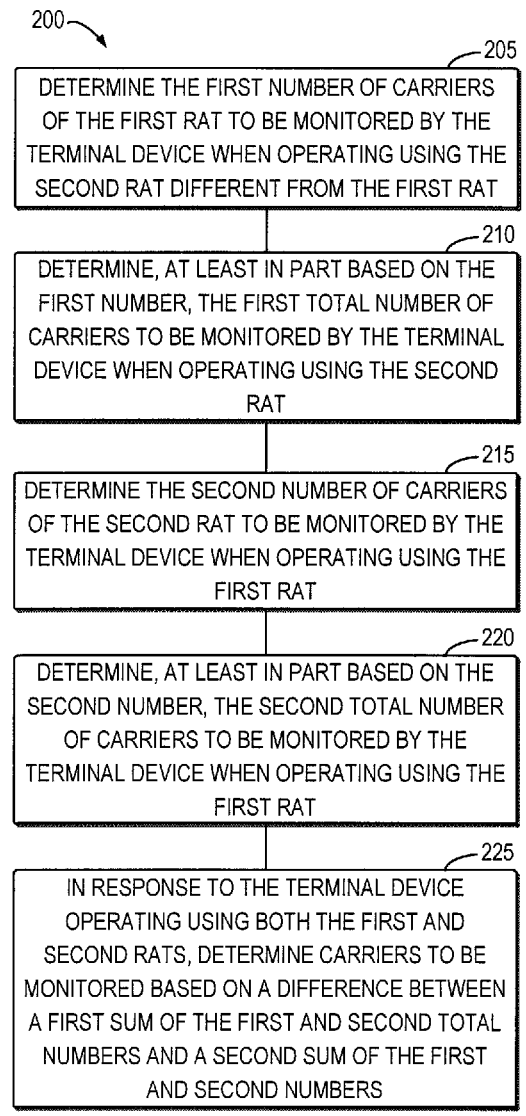
FIG. 2 shows a flowchart of an example method in accordance with some embodiments of the present disclosure.

FIG. 2 which shows a flowchart of an example method 200 in accordance with some embodiments of the present disclosure. The method 200 may be implemented at the terminal device 110, or the first or second access node 120 or 130, as shown in FIG. 1, or other network devices not shown in the network 100, such as the RNC. For the purpose of discussion, the method 200 will be described with reference to FIG. 1.

At block 205, the first number of carriers of the first RAT 140 to be monitored by the terminal device 110 when operating using the second RAT 150 is determined. The second RAT 150 is different from the first RAT 140. As described above, in some embodiments, the first RAT 140 may be implemented as the LTE, and the second RAT 150 may be implemented as the NR. Accordingly, the carriers of the first RAT 140 may be implemented as the LTE carriers, and the carriers of the second RAT 150 may be implemented as the NR carriers.

The first number of carriers of the first RAT 140 may be determined in any suitable way. For example, a measurement need of the network 100, as well as the measurement capability of the terminal device 110, may be considered. In some embodiments, network requirements on the first RAT 140 may be considered in the determination. For example, the first number of carriers of the first RAT 140 may be determined based on the number of carriers of the first RAT 140 to be monitored when the terminal device 110 operates using the first RAT 140.

In some other embodiments, the terminal capabilities may also be considered. For example, when the terminal device 110 is operating using the second RAT 150, the terminal device 110 may be required to monitor carriers of the second RAT 150. Considering the hardware limitation of the terminal device 110, the first number of carriers of the first RAT 140 may be determined to be less than the required number of carriers of the first RAT 140 when the terminal device 110 operates using the first RAT 140. Furthermore, in order to further increase flexibility of network deployment, in some embodiments, the first number of carriers of the first RAT 140 may be determined to be as many as possible.

At least in part based on the first number of carriers of the first RAT 140 determined at block 205, the first total number of carriers to be monitored by the terminal device 110 when operating using the second RAT 150 is determined at block 210. The first total number of carriers may be determined based on the first number of carriers of the first RAT 140 and optionally one or more other relevant factors.

As described above, when the terminal device 110 operates using the second RAT 150, the terminal device 110 may be required to monitor the carriers of the second RAT 150. In this case, the number (referred to as a "third number") of carriers of the second RAT 150 to be monitored by the terminal device may also be determined. The third number of carriers of the second RAT 150 may be determined by considering the measurement need of the network 100 and the measurement capability of the terminal device 110 in a way similar to the determination of the first number of carriers of the first RAT 140 as described above. Further, the first total number of carriers may be determined at least in part based on a sum (referred to as a "third sum") of the first number of carriers of the first RAT 140 and the third number of carriers of the second RAT 150.

The first total number of carriers may be determined based on the third sum in any suitable way. In the embodiment where the first RAT 140 is the LTE and the second RAT 150 is the NR, the first total number of carriers may be determined to be less than or equal to the first number of LTE carriers and the third number of NR carriers to be monitored by the terminal device 110 when operating using the NR.

In addition to the first number of carriers of the first RAT 140 and the total number of carriers to be monitored in the second RAT 150, the second number of carriers of the second RAT 150 to be monitored by the terminal device 110 when operating using the first RAT 140 is determined at block 215. At block 220, the second total number of carriers to be monitored by the terminal device 110 when operating using the first RAT 140 is determined at least in part based on the second number. The determination of the second number of carriers of the second RAT 150 and the second total number of carriers to be monitored when the terminal device 110 operates using the first RAT 140 may be implemented in a way similar to the determination of the first number of carriers of the first RAT 140 and the total number of carriers to be monitored in the second RAT 150.

For example, similar to the operations of the terminal device 110 using the second RAT 150 as described above, when the terminal device 110 operates using the first RAT 140, the terminal device 110 may be required to monitor the carriers of the first RAT 140. In this case, in the embodiment where the first RAT 140 is the LTE and the second RAT 150 is the NR, the terminal device 110 may determine the number (referred to as a "fourth number") of the NR carriers to be monitored by the terminal device 110 when operating using the LTE. Further, the terminal device 110 may determine the second total number of carriers at least in part based on a sum of the second and fourth numbers.

In some embodiments, when the terminal device 110 operates using the LTE, the terminal device 110 may operate in a further RAT (referred to as a "third RAT") in addition to the first and second RATs 140 and 150. As an example, the third RAT may include the UMTS, the GSM, and the like. In this case, the number (referred to as a "fifth number") of carriers of the third RAT to be monitored by the terminal device 110 when operating using the LTE may be determined. Further, the second total number of carriers may be determined at least in part based on a sum (referred to as a "fourth") of the second, fourth and fifth numbers of carriers.

At block 225, carriers to be monitored by the terminal device 110 when operating using both the first and second RATs 140 and 150 are determined based on a difference between the first sum of the first and second total numbers of carriers and the second sum of the first and second numbers of carriers.

In this way, when the terminal device 110 operates using both of the first and second RATs 140 and 150, the total number of carriers to be monitored may be determined by considering the combination of the numbers of carriers to be monitored using both the first and second RATs 140 and 150 with the subtraction of the duplicated number of carriers. As a result, the inter-RAT mobility and operation efficiency of the terminal device 110 may be increased.

For the purpose of illustration, an example will be described below where the first RAT 140 is the LTE and the second RAT 150 is the NR. When the terminal device 110 is operating only in the LTE cell, X carriers of the GSM, and Y carriers of the UMTS, and Z carriers of the LTE may be monitored by the terminal device 110 in the inter-RAT measurements, where values of X, Y, and Z comply with the requirements in the specifications for the LTE. Furthermore, K carriers of the NR may be monitored by the terminal device 110 in the inter-frequency measurements. A value of K may be determined considering the requirements in the specifications for the NR. In total, the terminal device 110 needs to monitor M carriers with $M<=X+Y+Z+K$.

When the terminal device 110 is operating only in the NR cell, B carriers of the LTE may be monitored by the terminal device 110 in the inter-RAT measurements. Moreover, A carriers of the NR may be monitored by the terminal device 110 in the inter-frequency measurements. In this example, in order to simplify the terminal operations, the terminal device 110 when operating in the NR cell may be not required to monitor the carriers of all legacy RAT. In this case, the total number of carriers to be monitored by the terminal device 110 by be determined as $C<=A+B$.

When the terminal device 110 is operating in the EN-DC with the LTA and NR cells, the total number of carriers M1 to be monitored by the terminal device 110 may be determined as $M1=M+C-K-B$. In this way, when the terminal device 110 operates in the NSA mode, the number of carriers may be determined in alignment with the requirements of the specifications for both the LTE and the NR. Meanwhile, duplicated number of carriers may be subtracted from the total number of the carriers.

In addition to the difference between a first sum of the first and second total numbers of carriers and the second sum of the first and second numbers of carriers, in some embodiments, the determination of the carriers to be monitored by the terminal device 110 when operating using both the first and second RATs 140 and 150 may take any other suitable factors into account. In some embodiments, the hardware limitations of the terminal device 110 may be considered. For example, some carriers may be removed from candidate carriers to be monitored by the terminal device 110 due to the limitation of hard capability of the terminal device 110. The candidate carriers may include any suitable carrier which the terminal device 110 may be able to monitor when operating using both the first and second RATs 140 and 150.

The removal of the carriers may be implemented in accordance with any suitable rule. In some embodiments, the removal may be implemented based on the priorities of the carriers. For example, a set of carriers with measurement priorities above a threshold priority may be determined from the candidate carriers, as the carriers to be monitored by the terminal device 110. The threshold priority may be predefined in any suitable rule. Considering that a reduced performance group (RPG) of carriers in the LTE may have a lower measurement priority, in some embodiments, the threshold prior may be determined as the measurement priority of the RPG. In this case, the carriers in the RPG may be selected and further removed from the candidate carriers.

Some or all carriers in the RGP may be removed, for example, depending on the terminal measurement capability. If some carriers in the RGP are to be removed, any suitable rule may be used to determine which carriers in RPG should or should not be removed.

In addition to the total number of carriers to be monitored when the terminal device 110 operates using both the first and second RATs 140 and 150, the determination of the carriers to be monitored may involve any other suitable measurement requirements of carriers. In some embodiments, the number (referred to as a "sixth number") of carriers of the second RAT 150 to be monitored by the terminal device 110 and the number (referred to as a "seventh number") of carriers of the first RAT 140 to be monitored by the terminal device 110 may also be determined. This determination may also consider the measurement need of the network 100 and the measurement capability of the terminal device 110. In some embodiments, the sixth number may be determined as the number of carriers of the second RAT 150 to be monitored by the terminal device 110 when operating using the second RAT 150. The seventh number may be determined as the number of carriers of the first RAT 140 to be monitored by the terminal device 110 when operating using the first RAT 140.

By way of example, when the terminal device 110 is operating in the EN-DC, the number of carriers that the terminal device 110 may be able to monitor using a given technology will be limited by the number of carriers that the terminal device 110 may be able to monitor for that given technology. By way of example, if the terminal device 110 may be able to monitor K=3 NR inter-RAT carriers when operating using the LTE only and A=8 NR inter-frequency carriers when operating using the NR only, the terminal device 110, when operating in the NSA mode, will not be required to be able to monitor more than overall of 8 NR carriers. If the terminal device 110 may be able to monitor B=3 LTE inter-RAT carriers when operating in the NR SA mode, and the terminal device 110 may be able to monitor Z=8 LTE inter-frequency carrier when operating using the LTE, the terminal device 110 may only be able to monitor in all 8 LTE carriers when operating in the NSA mode.

Figure 3:
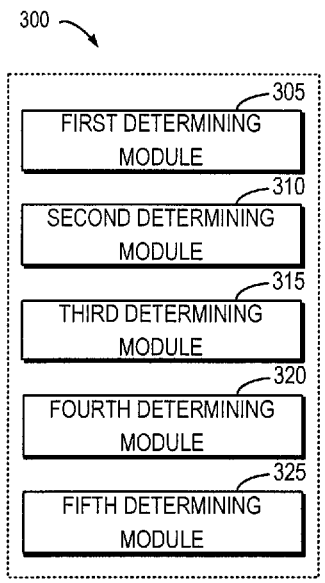
FIG. 3 shows a block diagram of an apparatus in accordance with some embodiments of the present disclosure.

FIG. 3 shows a block diagram of an apparatus 300 in accordance with some other embodiments of the present disclosure. The apparatus 300 can be implemented at the terminal device 110, or the first or second access node 120 or 130, as shown in FIG. 1, or other network devices not shown in the network 100, such as the RNC.

As shown, the apparatus 300 comprises: a first determining module 305 configured to determine a first number of carriers of a first radio access technology (RAT) to be monitored by a terminal device when operating using a second RAT different from the first RAT; a second determining module 310 configured to determine, at least in part based on the first number, a first total number of carriers to be monitored by the terminal device when operating using the second RAT; a third determining module 315 configured to determine a second number of carriers of the second RAT to be monitored by the terminal device when operating using the first RAT; a fourth determining module 320 configured to determine, at least in part based on the second number, a second total number of carriers to be monitored by the terminal device when operating using the first RAT; and a fifth determining module 325 configured to in response to the terminal device operating using both the first and second RATs, determine carriers to be monitored based on a difference between a first sum of the first and second total numbers and a second sum of the first and second numbers.

In some embodiments, the second determining module 305 may comprise: a sixth determining module configured to determine a third number of carriers of the second RAT to be monitored by the terminal device when operating using the second RAT; and a seventh determining module configured to determine the first total number at least in part based on a third sum of the first and third numbers.

In some embodiments, the first RAT includes Long Term Evolution (LTE) and the second RAT includes Next Radio (NR). In some embodiments, the seventh determining module may comprise: an eighth determining module configured to determine the first total number such that the first total number is less than or equal to the third sum.

In some embodiments, the fourth determining module 320 may comprise: a ninth determining module configured to determine a fourth number of carriers of the first RAT to be monitored by the terminal device when operating using the first RAT; a tenth determining module configured to determine a fifth number of carriers of a third RAT to be monitored by the terminal device when operating using the first RAT, the third RAT being different from the first and second RATs; and an eleventh determining module configured to determine the second total number at least in part based on a fourth sum of the second, fourth and fifth numbers.

In some embodiments, the fifth determining module 325 may comprise: a twelfth determining module configured to determine, from candidate carriers, a set of carriers with measurement priorities above a threshold priority as the carriers to be monitored.

In some embodiments, the twelfth determining module may comprise: a thirteenth determining module configured to determine the set of carriers by excluding carriers in a reduced performance group of carriers from the candidate carriers.

In some embodiments, the fifth determining module 325 may comprise: a fourteenth determining module configured to determine a sixth number of carriers of the second RAT to be monitored by the terminal device when operating using both the first and second RATs; and a fifteenth determining module configured to determine a seventh number of carriers of the first RAT to be monitored by the terminal device when operating using both the first and second RATs.

In some embodiments, the fourteenth determining module may comprise: a sixteenth determining unit configured to determine the sixth number as the number of carriers of the second RAT to be monitored by the terminal device when operating using the second RAT. In some embodiments, the fifteenth determining module may comprise: a seventeenth determining unit configured to determine the seventh number as the number of carriers of the first RAT to be monitored by the terminal device when operating using the first RAT.

It should be appreciated that modules included in the apparatus 300 correspond to the blocks of the method 200, respectively. Therefore, all operations and features described above with reference to FIG. 2 are likewise applicable to the modules included in the apparatus 300 and have similar effects. For the purpose of simplification, the details will be omitted.

The modules included in the apparatus 300 may be implemented in various manners, including software, hardware, firmware, or any combination thereof. In one embodiment, one or more modules may be implemented using software and/or firmware, for example, machine-executable instructions stored on the storage medium. In addition to or instead of machine-executable instructions, parts or all of the modules in the apparatus 300 may be implemented, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

Figure 4:
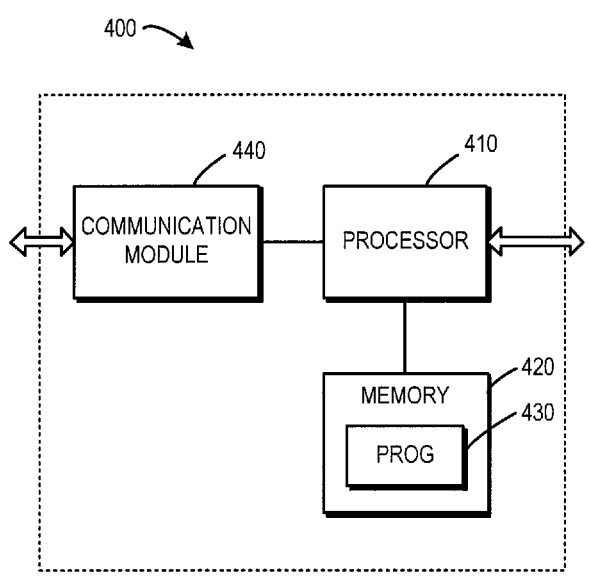
FIG. 4 shows a simplified block diagram of a device that is suitable for implementing embodiments of the present disclosure.

FIG. 4 is a simplified block diagram of a device 400 that is suitable for implementing embodiments of the present disclosure. The device 400 can be implemented at or as at least a part of the terminal device 110, or the first or second access node 120 or 130, as shown in FIG. 1, or other network devices not shown in the network 100, such as the RNC.

As shown, the device 400 includes a processor 410, a memory 420 coupled to the processor 410, a communication module 440 coupled to the processor 410, and a communication interface coupled to the communication module 440. The memory 410 stores at least a part of a program 430. The communication module 440 is for bidirectional communications. The communication interface may represent any interface that is necessary for communication with other network elements, such as X2 interface for bidirectional communications between eNBs, S1 interface for communication between a Mobility Management Entity (MME)/Serving Gateway (S-GW) and the eNB, Un interface for communication between the eNB and a relay node (RN), or Uu interface for communication between the eNB and a UE.

The program 430 is assumed to include program instructions that, when executed by the associated processor 410, enable the device 400 to operate in accordance with the embodiments of the present disclosure, as discussed herein with reference to FIG. 2. The embodiments herein may be implemented by computer software executable by the processor 410 of the device 400, or by hardware, or by a combination of software and hardware. The processor 410 may be configured to implement various embodiments of the present disclosure.

The memory 410 may be of any type suitable to the local technical network and may be implemented using any suitable data storage technology, such as a non-transitory computer readable storage medium, semiconductor based memory devices, magnetic memory devices and systems, optical memory devices and systems, fixed memory and removable memory, as non-limiting examples. While only one memory 410 is shown in the device 400, there may be several physically distinct memory modules in the device 400. The processor 410 may be of any type suitable to the local technical network, and may include one or more of general purpose computers, special purpose computers, microprocessors, digital signal processors (DSPs) and processors based on multicore processor architecture, as non-limiting examples. The device 400 may have multiple processors, such as an application specific integrated circuit chip that is slaved in time to a clock which synchronizes the main processor.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the methods 400 and 900 as described above with reference to FIGS. 4-10. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine readable medium, which may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A method comprising:
    determining a first number of carriers of a first radio access technology (RAT) to be monitored by a terminal device when operating using a second RAT different from the first RAT;
    determining, at least in part based on the first number, a first total number of carriers to be monitored by the terminal device when operating using the second RAT;
    determining a second number of carriers of the second RAT to be monitored by the terminal device when operating using the first RAT;
    determining, at least in part based on the second number, a second total number of carriers to be monitored by the terminal device when operating using the first RAT; and
    in response to the terminal device operating using both the first and second RATs, determining carriers to be monitored based on a difference between a first sum of the first and second total numbers and a second sum of the first and second numbers.

2. The method of claim 1, wherein the first RAT includes Long Term Evolution (LTE) and the second RAT includes Next Radio (NR).

3. The method of claim 1, wherein determining the first total number comprises:
    determining a third number of carriers of the second RAT to be monitored by the terminal device when operating using the second RAT; and
    determining the first total number at least in part based on a third sum of the first and third numbers.

4. The method of claim 3, wherein determining the first total number at least in part based on the third sum comprises:
    determining the first total number such that the first total number is less than or equal to the third sum.

5. The method of claim 3, wherein determining the second total number comprises:
    determining a fourth number of carriers of the first RAT to be monitored by the terminal device when operating using the first RAT;
    determining a fifth number of carriers of a third RAT to be monitored by the terminal device when operating using the first RAT, the third RAT being different from the first and second RATs; and
    determining the second total number at least in part based on a fourth sum of the second, fourth and fifth numbers.

6. The method of claim 1, wherein determining the carriers to be monitored comprises:
    determining, from candidate carriers, a set of carriers with measurement priorities above a threshold priority as the carriers to be monitored.

7. The method of claim 6, wherein determining the set of carriers comprises:
    determining the set of carriers by excluding carriers in a reduced performance group of carriers from the candidate carriers.

8. The method of claim 1, wherein determining the carriers to be monitored comprises:
    determining a sixth number of carriers of the second RAT to be monitored by the terminal device when operating using both the first and second RATs; and
    determining a seventh number of carriers of the first RAT to be monitored by the terminal device when operating using both the first and second RATs.

9. The method of claim 8, wherein determining the sixth number comprises:
    determining the sixth number as the number of carriers of the second RAT to be monitored by the terminal device when operating using the second RAT.

10. The method of claim 8, wherein determining the seventh number comprises:
    determining the seventh number as the number of carriers of the first RAT to be monitored by the terminal device when operating using the first RAT.

11. A device comprising:
    at least one processor; and
    at least one memory comprising computer program code, the at least one memory and computer program code configured, with the at least one processor, to cause the device at least to:
        determine a first number of carriers of a first radio access technology (RAT) to be monitored by the device when operating using a second RAT different from the first RAT;
        determine, at least in part based on the first number, a first total number of carriers to be monitored by the device when operating using the second RAT;
        determine a second number of carriers of the second RAT to be monitored by the device when operating using the first RAT;
        determine, at least in part based on the second number, a second total number of carriers to be monitored by the device when operating using the first RAT; and
        in response to the device operating using both the first and second RATs, determine carriers to be monitored based on a difference between a first sum of the first and second total numbers and a second sum of the first and second numbers.

12. The device of claim 11, wherein the first RAT includes Long Term Evolution (LTE) and the second RAT includes Next Radio (NR).

13. The device of claim 11, wherein determining the first total number comprises:
    determining a third number of carriers of the second RAT to be monitored by the device when operating using the second RAT; and
    determining the first total number at least in part based on a third sum of the first and third numbers.

14. The device of claim 13, wherein determining the first total number at least in part based on the third sum comprises:
    determining the first total number such that the first total number is less than or equal to the third sum.

15. The device of claim 13, wherein determining the second total number comprises:
    determining a fourth number of carriers of the first RAT to be monitored by the device when operating using the first RAT;
    determining a fifth number of carriers of a third RAT to be monitored by the device when operating using the first RAT, the third RAT being different from the first and second RATs; and determining the second total number at least in part based on a fourth sum of the second, fourth and fifth numbers.

16. The device of claim 13, wherein determining the carriers to be monitored comprises:
determining, from candidate carriers, a set of carriers with measurement priorities above a threshold priority as the carriers to be monitored.

17. The device of claim 16, wherein determining the set of carriers comprises:
determining the set of carriers by excluding carriers in a reduced performance group of carriers from the candidate carriers.

18. The device of claim 13, wherein determining the carriers to be monitored comprises:
determining a sixth number of carriers of the second RAT to be monitored by the device when operating using both the first and second RATs; and
determining a seventh number of carriers of the first RAT to be monitored by the device when operating using both the first and second RATs.

19. The device of claim 18, wherein determining the sixth number comprises:
determining the sixth number as the number of carriers of the second RAT to be monitored by the device when operating using the second RAT.

20. The device of claim 18, wherein determining the seventh number comprises:
determining the seventh number as the number of carriers of the first RAT to be monitored by the device when operating using the first RAT.

* * * * *